3,069,226
METHOD OF AND APPARATUS FOR PREVENTING BLINDING OF MICRO-FILTERS
Percival Lionel Boucher, London, England, assignor to Glenfield & Kennedy Limited, Kilmarnock, Scotland, a corporation of Great Britain and Northern Ireland
Filed Feb. 25, 1960, Ser. No. 10,991
2 Claims. (Cl. 21—54)

This invention relates to a method of and apparatus for preventing blinding of a micro-filter incorporating a movable screen composed of stainless steel or other corrosion-resisting wire fabric and presenting apertures of microscopic proportions. The filter may be of the kind disclosed in our prior British specification No. 588,885.

When a micro-filter is used in a sewage works for filtering solid humus from the effluent, the surface of the fabric tends to become coated after a period of time, which may vary from a few days to several weeks, with bacterial slime which spreads over the fabric until the rate of flow of liquid through the filter is substantially reduced by what is termed "blinding."

The method according to the invention consists in subjecting the fabric of the filter to radiation with ultra-violet light.

Figure 1:
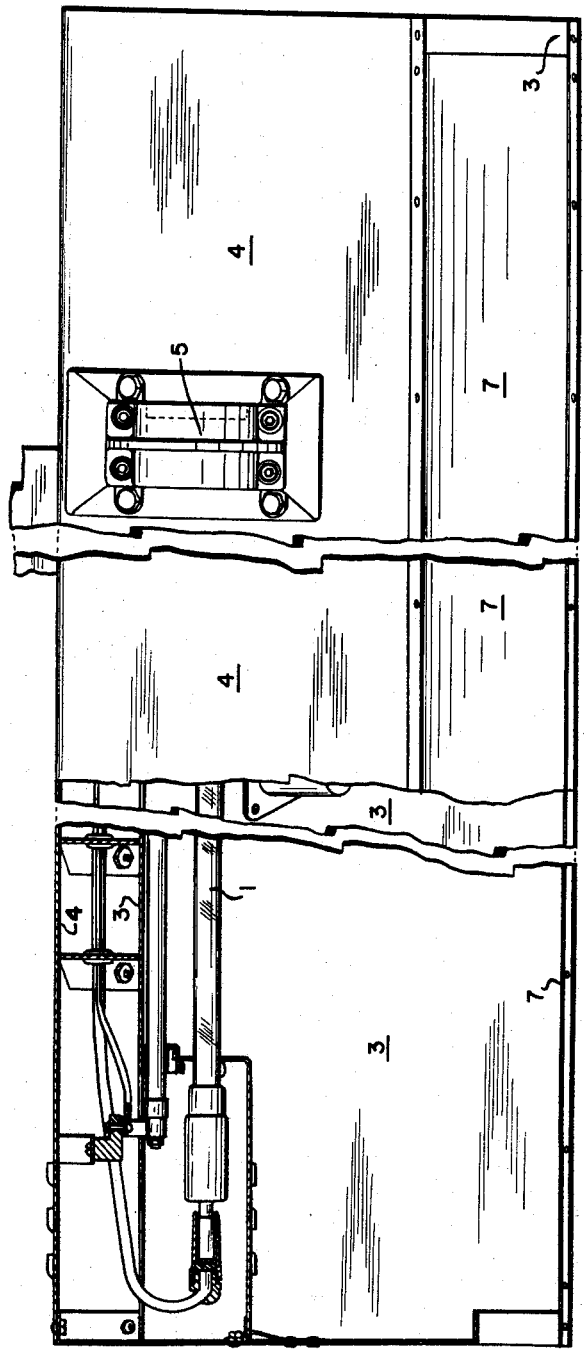
Figure 2:
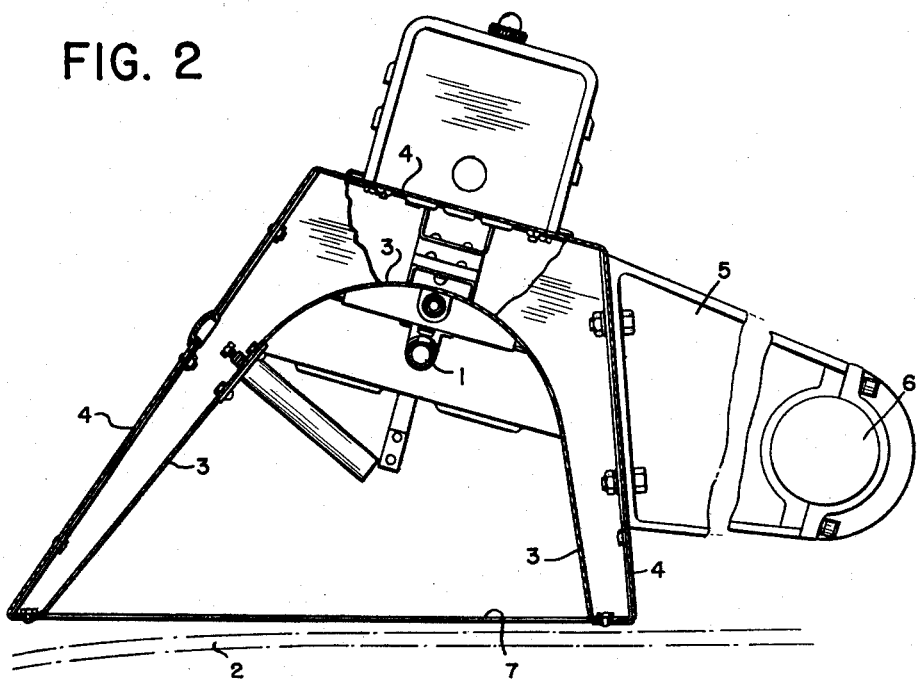

Apparatus for performing the method according to the invention is illustrated in the accompanying drawings in which:

FIG. 1 is a broken view partly in longitudinal section of an apparatus according to the invention, and FIG. 2 is a cross-sectional view through the apparatus illustrated in FIG. 1.

Referring to the drawings, 1 denotes a lamp arranged to radiate ultra-violet light on to the fabric of a screen 2 (FIG. 2), forming the periphery of a rotatable drum and composed of stainless steel or other corrosion-resisting wire fabric presenting apertures of microscopic proportions. The apparatus is arranged to extend parallel to the axis of the drum adjacent to the surface of the fabric above the level of liquid being filtered through the screen 2.

The lamp 1 is masked from above by guards 3 and 4 arranged to protect the lamp from splashes of liquid and to protect personnel operating the apparatus from the effects of radiation of ultra-violet light from the lamp 1. The guard 4 is secured by brackets 5 (one only of which is illustrated) to a support 6 mounted above the filter. The guard 3 also serves as a reflector to increase the intensity of radiation of the ultra-violet light on the fabric 2.

A filter 7 extending across the mouth of the guard 3 serves to intercept those wave lengths of the ultra-violet light which produce ozone in contact with the air. Ozone would cause corrosion of the screen 2.

In practice, radiation of ultra-violet light from the lamp 1 may be continuous during rotation of the drum carrying the screen 2, or the radiation may be intermittent, in which case the apparatus is provided with an automatic time switch for switching the lamp 1 "on" and "off" at predetermined intervals of time.

The apparatus may be applied to a filter for filtering solid humus from the effluent in a sewage works, in which case radiation of ultra-violet light from the lamp 1 inhibits the growth of bacteria on the fabric of the screen 2 and prevents blinding of the filter.

Alternatively, the apparatus may be applied to a filter for filtering water, in which case radiation of ultra-violet light from the lamp 1 prevents blinding of the filter by a film of organic matter.

Although in the apparatus as described and illustrated radiation of ultra-violet light is directed from the outside towards the interior of the drum, sufficient reflection and refraction of the light occurs to maintain the inner surface of the screen 2 clear of bacterial growth or of organic slime.

It is to be understood that the invention provides for continuous operation of the filter without the necessity for stopping the filter for clearing the screen 2 by, for example, chemical means.

What is claimed is:

1. In the method of filtering water and water-containing materials in which the water and water-containing materials are subjected to filtration through a movable wire fabric filter screen having apertures of microscopic proportions, the improvement comprising subjecting the moving screen above the level of the water or water-containing materials being filtered to radiation with ultra-violet light from an ultra-violet light source for inhibiting the growth of bacteria on the screen, modifying the ultra-violet light delivered by the light source by transmitting it through a light filter having the property of intercepting those wave lengths of ultra-violet light which produce ozone in contact with air, said light filter having the property of passing those wave lengths of ultra-violet light which inhibit the growth of bacteria so that they pass on to the wire fabric screen where they inhibit the growth of bacteria.

2. In a apparatus for filtering water and water-containing materials including a movable corrosion resistant wire fabric screen having apertures of microscopic proportions, a portion of said screen being in the water or water containing materials during the filtering operation and a portion of the screen being above the level of the water and water-containing materials being filtered, the improvement including a lamp mounted above the portion of the movable screen as it moves above said level, said lamp being arranged to radiate ultra-violet light toward the screen, a guard masking said lamp in such a manner as to concentrate the radiation of ultraviolet light from said lamp toward said screen, and a light filter mounted between the lamp and the filter screen and having the property to intercept those wave lengths of ultra-violet light which produce ozone in contact with air while passing those wave lengths of the ultra-violet light which inhibit the growth of bacteria so that they act on the fabric screen and prevent blinding thereof by the growth of bacteria.

References Cited in the file of this patent
UNITED STATES PATENTS

| | | |
|---|---|---|
| 2,537,530 | Hofman | Jan. 9, 1951 |
| 2,935,156 | Scofield | May 3, 1960 |
| 2,941,265 | Isenberg et al. | June 21, 1960 |

OTHER REFERENCES

Ellis et al.: The Chemical Action of Ultraviolet Rays; 1941, Reinhold Publishing Corp., N.Y. pp. 692–693 and 292–293.